Nov. 3, 1964  C. L. JENCKS ETAL  3,155,795
CIRCUIT BREAKER TRIP DEVICE WITH AMBIENT COMPENSATION
AND ADJUSTING MEANS THEREFOR
Filed Aug. 24, 1962

*INVENTORS*
CHARLES L. JENCKS,
FRANK H. MURPHY
BY Robert T. Casey
ATTORNEY 3,155,795
CIRCUIT BREAKER TRIP DEVICE WITH AMBIENT COMPENSATION AND ADJUSTING MEANS THEREFOR
Charles L. Jencks, Avon, and Frank H. Murphy, West Hartford, Conn., assignors to General Electric Company, a corporation of New York
Filed Aug. 24, 1962, Ser. No. 219,237
3 Claims. (Cl. 200—116)

Our invention relates to electric circuit breaker trip devices and particularly to such trip devices including means for compensating for changes in circumambient atmospheric temperature. The invention of this application was first shown and described in our co-pending application Serial Number 100,960, filed April 5, 1961, now Patent No. 3,053,954, issued September 11, 1962, and assigned to the same assignee as the present invention.

Electric circuit breakers of the type referred to commonly include a thermally responsive member such as a bimetallic strip, together with means for heating it in accordance with the current passing through the circuit breaker. Means is also included whereby, when the bimetallic strip attains a predetermined temperature, indicative of predetermined current conditions in the circuit, a latch member is released, causing automatic opening of the circuit breaker.

Since the accuracy of operation of such devices is affected by heating of the current responsive bimetallic strip by means other than the current passing through the circuit breaker, means has commonly been provided for "compensating" for changes in temperature due to other causes, such as an increase in temperature of the general environment in which the breaker is located. While such compensating arrangements have been found useful within certain ranges, it has been found that when the temperature increases beyond a certain point, it is not desirable to have such compensating arrangements in operation.

It is an object of the present invention to provide a trip device for an electric circuit breaker which shall include a thermally responsive device, together with means for compensating for increases in ambient temperature within a predetermined range, which will be relatively inexpensive, simple, and reliable.

It is another object of the invention to provide such a trip device which will include means providing for a lower as well as an upper limit to the effect of the ambient compensation.

It is a further object of the invention to provide such a trip device which includes a single means for adjusting the range of temperature in which ambient compensation is effective, that is, for adjusting both the maximum and minimum compensation range points simultaneously.

It is a further object of the invention to provide a trip device of the type described which is suitable for use with a multi-pole circuit breaker and which includes means for independently adjusting the ambient compensation range characteristics of each pole of such a circuit breaker.

In accordance with the invention in one form, an electric circuit breaker trip device is provided including a first or "current responsive" bimetallic strip, together with means for heating said first bimetallic strip in response to the current passing through a particular current path or "pole" of a circuit breaker. A latch member is also provided, which normally serves to restrain the circuit breaker from tripping but which is movable in a first direction to cause tripping of the circuit breaker. The current responsive bimetallic strip is adapted to act on the latch member to move it in the tripping direction. For the purpose of providing ambient compensation action, an ambient compensating bimetallic strip is introduced between the current responsive bimetallic strip and the latch member. The ambient compensating bimetallic strip is mounted on the latch member and includes an adjustable set-screw which is arranged to be engaged by the current responsive bimetallic strip. Deflection of the ambient compensating bimetallic strip due to changes in ambient temperature moves the aforesaid set screw with respect to the main body of the latch member, and therefore changes the amount of movement required of the current responsive bimetal to cause tripping.

For the purpose of limiting the amount of compensating action introduced by the compensating bimetallic strip, an adjustable stop member is provided, also carried by the main latch member and including a pair of spaced circular flanges which are disposed and arranged to be engaged respectively by deflection of the ambient compensating bimetal in either direction. The stop member is adjustably mounted on the latch member, whereby adjusting movement thereof moves both the maximum and the minimum stops, and shifts the range of compensating temperature. In a preferred form, the latch member comprises an elongated latch or "trip" bar carrying a single latch but also carrying a separate ambient compensating bimetallic strip and set screw together with separate adjustable range determining stop members for each of the current paths or "poles" of such a multi-pole circuit breaker.

The invention will be more fully understood from the following detailed description, and its scope will be pointed out in the appended claims.

Figure 1:
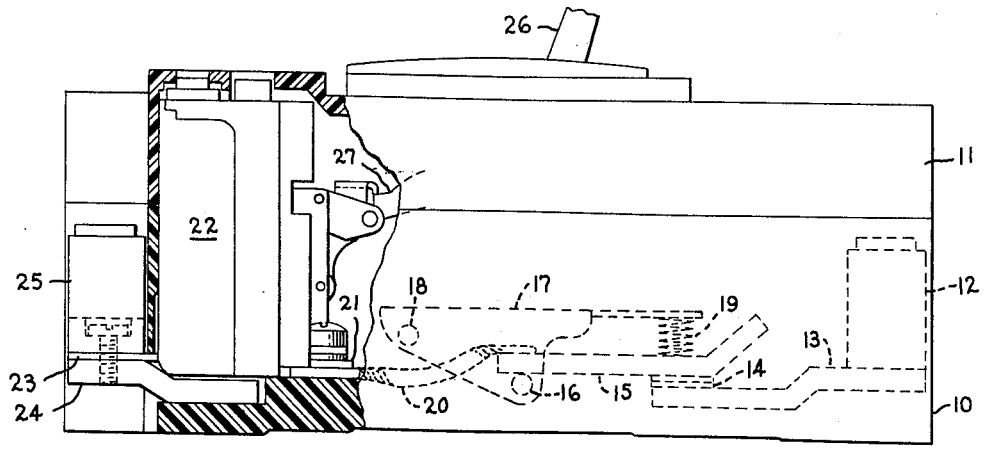
FIGURE 1 is a side elevation view of an electric circuit breaker incorporating the invention, a portion of the side wall being broken away.
Figure 2:
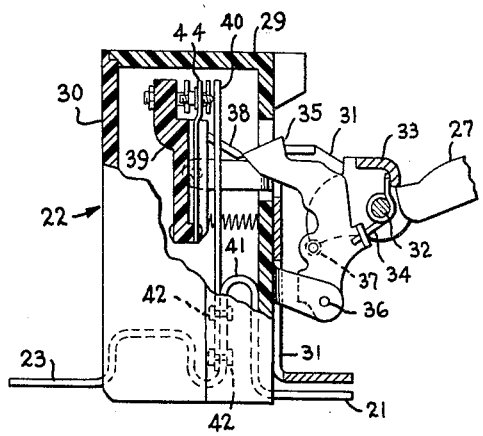
FIGURE 2 is a side elevation view of the trip device portion of the circuit breaker of FIGURE 1, a portion of the side wall of the enclosure of the trip device being broken away.
Figure 4:
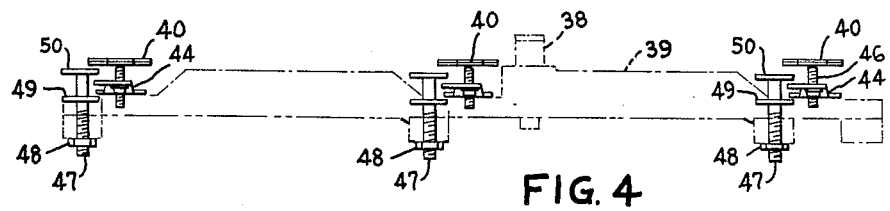
Figure 5:
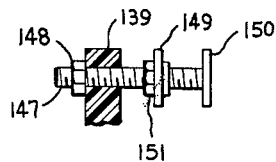

FIGURE 4 is a top plan view of a portion of the trip device of FIGURE 2, taken as on the line 4—4 of FIG. 2, and showing the trip bar assembly (the trip bar itself being shown in dotted lines), the compensating means carried by the tip bar, including the compensation-limiting means, and showing the main current-responsive means (not a part of the trip bar assembly) in engagement with the trip bar assembly, and FIGURE 5 is a fragmentary view of a modified form of adjustable stop member.

In the drawing, the invention is shown as incorporated in an electric circuit breaker comprising an insulating casing having a base 10 and cover 11. An incoming or "line" terminal 12 is provided for each current path or "pole" of the circuit breaker at one end thereof, being supported by a connecting strap 13 which leads to and supports a stationary contact 14. A relatively movable contact 15 is pivotally supported by pivot pin 16 on a contact arm 17 which in turn is pivotally supported in the casing by pivot pin 18. A compression spring 19 is provided between the contact arm 17 and the contact member 15. The movable contact member 15 is connected by a flexible conductor or braid 20 to one terminal 21 of a trip device or trip unit 22, to be more fully described. The outgoing terminal 23 (see FIGURE 2) of the trip unit 22 is connected to a load terminal strap 24 which in turn supports and is connected to a load terminal connector 25.

It will be understood that the conductive parts just described comprise one current path or "pole" through the circuit breaker. The circuit breaker illustrated is of the multi-pole type, and includes three such current paths or "poles" of similar construction.

Operating mechanism, not shown, is provided for moving the movable contacts 15 between open and closed circuit positions, including a member 27 which is releasable to cause automatic opening of the contacts. Any suitable operating mechanism may be used, such for example, as the operating mechanism shown and described in our aforesaid Patent 3,053,954.

The current responsive tripping mechanism is contained within a separate insulating enclosure which is removable as such from the main circuit breaker enclosure, this removable assembly being referred to for convenience as a "trip unit" 22. Referring particularly to FIGURE 2, the enclosure of the trip unit 22 includes a first portion 29 and a second portion 30. A latch mechanism supporting frame 31 is rigidly attached to the outer face of the first portion 29 by suitable means such as by rivets, not shown. A pivot pin 32 is supported between the opposed side portions of the frame 31. The primary latch member 33 is pivotally and slidably supported on the pivot pin 32 and is biased in a clockwise direction, as viewed, by means of spring 34. A secondary latch member 35 is also pivotally supported on the frame 31, by a pivot pin 36. The secondary latch member 35 carries a roller 37, and the primary latch member 33 has an engagement with the roller 37 such that the primary latch 33, when loaded by the releasable member 27, biases the secondary latch 35 for rotation in a counterclockwise direction as viewed.

The secondary latch member 35 is restrained from rotating in a counterclockwise direction as viewed by reason of its engagement with a secondary latch retaining member 38 which is rigidly carried by a trip bar 39, see FIGURE 4, extending across all three poles of the circuit breaker.

In operation, rotation of the trip bar 39 in counterclockwise direction as viewed in FIGURE 2, moves the secondary latch retaining member 38 out of the path of movement of the secondary latch member 35 and permits the secondary latch 35 to move in a counterclockwise direction, which in turn, permits the primary latch 33 to rotate in a counterclockwise direction, releasing the releasable member 27.

For the purpose of causing rotation of the trip bar 39 in response to overload current conditions, a bimetallic strip 40 is provided at each pole of the circuit breaker, being mounted on an intermediate return-bent portion 41 of the main current conductor extending through the trip unit at that particular pole, by suitable means, such as by rivets 42. This return-bent portion 41 acts as a heater to produce heat which causes deflection of the bimetallic strip 40.

For the purpose of providing ambient temperature compensating action, an ambient compensating bimetallic strip 44 is provided at each pole location. The compensating bimetallic strip 44 is mounted at one end on the trip bar 39 by suitable means such as by rivets 45, see FIGURE 3. The compensating bimetallic strip 44 carries a calibrating screw 46 in threaded relation thereto, having one end thereof disposed and arranged to be engaged by the current responsive bimetallic strip 40. Since the current responsive bimetallic strip 40 acts on the trip bar 39 through the agency of the compensating bimetallic strip 44, it will be observed that the position or condition of the compensating bimetallic strip 44 alters the amount of movement of the current responsive bimetallic strip 40 which is necessary to cause tripping action of the latch 38.

The compensating bimetallic strip 44 is disposed and arranged to deflect so as to move the calibrating screw 46 to the left as viewed in FIGURE 2 upon an increase in the ambient temperature. Since the ambient temperature affects both the compensating bimetallic strip and the current responsive bimetallic strip, it will be apparent that no net change takes place in their relative positions of the calibrating screw and the movable end of the bimetallic strip 40. Thus an increase in ambient temperature, subject to the qualifications to be described below, and within a predetermined range to be described, has no effect upon the calibration or tripping of the circuit breaker. Adjustments of the calibrating screw 46 is used to pre-set the tripping point of the thermal tripping as caused by the bimetallic strip 40.

In a similar manner, a decrease in temperature causes movement of the bimetallic strip 44 so as to move the calibrating screw 46 to the right as viewed in FIGURE 2. Since such a decrease in ambient temperature also has the effect of moving the current responsive bimetallic strip in such a way as to move its outer end toward the right as viewed in FIGURE 2, again no net change takes place in their relative positions.

In accordance with the invention, means is provided for limiting the range of temperature within which the ambient compensating action above described takes place. For this purpose, an adjustable stop member 47 is provided which is threadedly engaged in the trip bar 39 adjacent the movable end of each ambient compensating bimetallic strip 44. The member 47 is adapted to be locked in a predetermined position by means of a lock nut 48. The adjustable member 47 carries at one end a pair of spaced flange members or stops 49 and 50. The flange members 49 and 50 are dimensioned and positioned so as to lie in the path of movement of a portion 44A of the compensating bimetallic strip 44, see FIGURE 3.

Upon an increase in ambient temperature which is of such a degree to move the compensating bimetallic strip 44 far enough to the left as viewed in FIGURE 2, for example, the portion 44A of the compensating bimetallic strip 44 engages the flange 49, and further movement of the calibrating screw 46 in this direction is prevented.

It is desirable that an upper limit be provided for the ambient compensating action, in order that the trip device will produce tripping action upon a given excessive increase in temperature of the apparatus, regardless of what the cause thereof might be. This is primarily a safety precaution. In addition to assuring tripping action regardless of what the cause of the increase of temperature, it prevents the compensating bimetal from accidentally defeating the tripping action of the current responsive bimetal due to any unusual circumstance by which heat generated due to current may conceivably affect the compensating bimetallic strip.

Likewise, upon a decrease in temperature below a predetermined point, deflection of the compensating bimetallic strip 44 to the right as viewed in FIGURE 2 is limited by engagement of the portion 44A with the stop flange 50. This permits the ambient temperature to have an effect upon the amount of heating of the current responsive bimetal which is necessary to trip. In other words, at such low temperatures, with the ambient temperature compensating element being rendered ineffective, the circuit breaker can carry more current before tripping occurs than it can at higher temperatures. There is, however, no danger involved, since at such low ambient temperatures the breaker and its associated conductors can safely carry such increased current, and it is desirable to make this possible, to permit the efficient use of the apparatus.

Figure 3:
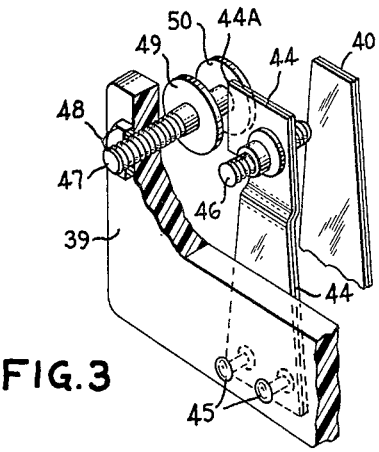
FIGURE 3 is a fragmentary perspective view showing a portion of the trip device of FIGURE 2.

Since, in the form of the invention shown in FIGURE 3, the flange members 49, 50 are an integral part of the adjustable member 47, their spacing is fixedly and accurately predetermined. In assembling and adjusting the circuit breaker, therefore, it is only necessary to set the position of one of the flanges such as 49, and the correct position is obtained for the other flange, since the range of compensation is predetermined by the predetermined spacing.

In the form of the invention shown in FIGURE 5, an adjustable stop member is provided comprising a threaded shank 147 having an integral flange 150 at one end thereof, and threadedly engaged with a trip bar 139, to which it is locked in place by a lock nut 148. In this form, the flange 149 is made adjustable with respect to the flange 150 by being itself threadedly carried by the shank 147, a lock nut 151 being provided to lock it in place. It will be observed that in this form of the invention, it is possible to adjust the extent or range of temperature in which ambient compensation is effective, by adjusting the position of the flange 149 with respect to the flange 150. At the same time, it is possible to adjust both the maximum and minimum positions by loosening the stop nut 148 and rotating the assembly including the shank 147 and the flanges 149 and 150 by means of the flange 150.

It will be observed that a circuit breaker trip device has been provided including ambient temperature compensating means which is operable within predetermined limits which are readily adjustable and which can be varied simultaneously or, according to the modified form, can be independently as well as simultaneously varied.

Although the invention has been shown in only two specific embodiments, it will be readily apparent that many modifications thereof may readily be made, and I therefore intend by the appended claims to cover all such modifications as fall within the true spirit and scope of the invention.

What we claim as new and desire to secure by Letters Patent of the United States is:

1. An electric circuit breaker comprising:
   (a) an insulating casing,
   (b) at least two relatively movable contacts mounted within said casing,
   (c) operating mechanism for operating said relatively movable contacts including a manually operable handle member and a releasable member releasable to cause automatic opening of said contacts,
   (d) a latch member mounted in said casing and movable to cause release of said releasable member,
   (e) a current responsive bimetallic strip mounted in said casing,
   (f) means in said casing for heating said current responsive bimetallic strip in response to current passing through said separable contacts,
   (g) an ambient temperature compensating bimetallic strip mounted on said latch member and including a portion engaged by said current responsive bimetallic member upon deflection thereof due to heating,
   (h) a stop member carried by said latch member, said stop member having a pair of spaced stop portions, one of said stop portions being engaged by and limiting deflection of said ambient compensating bimetallic strip in an increasing temperature direction and the other of said stop portions being engaged by and limiting deflection of said ambient compensating bimetallic strip in a decreasing temperature direction, and
   (i) said stop member being adjustable to change the position of said stop portions relative to said latch member, whereby to vary the maximum and minimum temperature limits beyond which said ambient compensating bimetallic strip is ineffective.

2. An electric circuit breaker comprising:
   (a) an insulating casing,
   (b) at least two relatively movable contacts within said insulating casing,
   (c) operating mechanism for operating said movable contacts between open and closed circuit positions comprising a manually engageable handle portion and a releasable member releasable to cause automatic opening of said contacts,
   (d) a latch member pivotally mounted in said casing and movable to cause release of said releasable member,
   (e) a first bimetallic strip mounted in said casing adjacent said strip means and having a movable end,
   (f) means in said casing for heating said first bimetallic strip in response to current passing through said relatively movable contacts,
   (g) an ambient temperature compensating bimetallic strip carried by said latch member and including a movable end adjacent said movable end of said first bimetallic strip,
   (h) an adjustable stop member carried by said trip bar adjacent said movable end of said ambient temperature compensating bimetallic strip, said adjustable stop member comprising a shaft portion threadedly received within said trip bar,
   (i) locking means for locking said threaded shaft with respect to said trip bar,
   (j) a pair of circular flanges carried by said shaft portion and spaced apart axially of said shaft portion, said flanges lying in the path of movement of said ambient compensating bimetallic strip on either side thereof,
   (k) one of said flanges limiting deflection of said ambient compensating bimetal in an increasing temperature direction and the other of said flanges limiting deflection of said compensating bimetallic strip in a decreasing temperature direction.

3. An electric circuit breaker comprising:
   (a) an insulating casing,
   (b) at least two relatively movable contacts within said insulating casing,
   (c) operating mechanism for operating said contacts between open and closed circuit positions comprising a manually engageable handle portion and a releasable member releasable to cause automatic opening of said contacts,
   (d) a latch member mounted in said casing and movable to cause release of said releasable member,
   (e) an elongated bimetallic strip mounted in said casing adjacent said latch member and including a portion heated in response to current through said separable contacts and a movable end portion extending adjacent said latch member,
   (f) an ambient compensating bimetallic strip mounted on said latch member and having a movable end portion disposed and arranged adjacent said movable end portion of said current responsive bimetallic strip,
   (g) adjustable stop means carried by said latch member adjacent said compensating bimetallic strip comprising an elongated stud having a threaded engagement with said trip bar and having a head portion,
   (h) a locking nut locking said threaded stud with respect to said trip bar,
   (i) said head portion of said stud being positioned closed to and at one side of said movable end portion of said ambient compensating bimetallic strip and limiting deflection of said ambient compensating bimetallic strip in a first direction,
   (j) a stop member threadedly carried by said stud in axially spaced relation to said head portion, said stop member being positioned close to and at the side of said movable end portion of said ambient compensating bimetallic strip opposite from said one side and limiting deflection of said ambient compensating bimetallic strip in a second direction opposite to said first direction,
   (k) locking means for locking said stop member with respect to said stud,
   (m) whereby said stop member may be adjustably positioned with respect to said head and whereby both said head and said stop member may be moved with respect to said latch member without changing their spacing with respect to each other.

References Cited in the file of this patent

UNITED STATES PATENTS

| | | |
|---|---|---|
| 2,328,767 | Adam et al. | Sept. 7, 1943 |
| 2,656,440 | Dorfman | Oct. 20, 1953 |
| 2,666,828 | Dyer et al. | Jan. 19, 1954 |
| 2,922,008 | Cellerini et al. | Jan. 19, 1960 |